US011022717B2

(12) United States Patent
Ohanian, III et al.

(10) Patent No.: US 11,022,717 B2
(45) Date of Patent: Jun. 1, 2021

(54) DISTRIBUTED MEASUREMENT OF MINIMUM AND MAXIMUM IN-SITU STRESS IN SUBSTRATES

(71) Applicant: Luna Innovations Incorporated, Roanoke, VA (US)

(72) Inventors: Osgar John Ohanian, III, Blacksburg, VA (US); Daniel R. Vandenberge, Cookeville, TN (US); Matthew Anthony Davis, Christiansburg, VA (US)

(73) Assignees: Luna Innovations Incorporated, Roanoke, VA (US); Tennessee Technological University, Cookeville, TN (US)

( * ) Notice: Subject to any disclaimer, the term of this patent is extended or adjusted under 35 U.S.C. 154(b) by 4 days.

(21) Appl. No.: 16/114,376

(22) Filed: Aug. 28, 2018

(65) Prior Publication Data
US 2019/0064387 A1 Feb. 28, 2019

Related U.S. Application Data

(60) Provisional application No. 62/551,419, filed on Aug. 29, 2017.

(51) Int. Cl.
*G01V 8/16* (2006.01)
*E21B 47/06* (2012.01)
(Continued)

(52) U.S. Cl.
CPC ............... *G01V 8/16* (2013.01); *E21B 47/06* (2013.01); *E21B 47/135* (2020.05);
(Continued)

(58) Field of Classification Search
CPC ....... G01V 8/16; E21B 47/123; E21B 49/006; E21B 47/06; G01N 21/47; G01N 2021/4735; G01L 1/243
See application file for complete search history.

(56) References Cited

U.S. PATENT DOCUMENTS 3,961,524 A 6/1976 de la Cruz
4,149,409 A 4/1979 Serata
(Continued)

FOREIGN PATENT DOCUMENTS

WO 98/50673 11/1998

OTHER PUBLICATIONS

Jason, The MITRE Corporation, "Subsurface Characterization Letter Report" JSR-14-Task-013, Sep. 2014, 18 pages.
(Continued)

*Primary Examiner* — Mohamed K Amara
(74) *Attorney, Agent, or Firm* — Nixon & Vanderhye P.C.

(57) ABSTRACT

A system for performing distributed measurements of in-situ stress includes an expandable element with at least one fiber optic sensor. The expandable element can be positioned at various depths in a hole in a substrate. A pressurizing device expands (and contracts) the expandable element when the expandable element is inserted in the hole in the substrate to exert pressure on the hole wall. A pressure sensor provides a sensor output indicative of a pressure applied to the hole wall by the expandable element. The fiber optic sensor and an optical interrogator measure strain along a length of the sensor in a continuous, high spatial resolution manner Based on the measured strain and pressure sensor output, the system determines various properties of the substrate such as, minimum principal stress, maximum principal stress, and/or principal stress direction associated with one or more fractures in the substrate, as well as substrate modulus.

21 Claims, 13 Drawing Sheets

(51) Int. Cl.
*G01N 21/47* (2006.01)
*G01L 1/24* (2006.01)
*E21B 49/00* (2006.01)
*E21B 47/135* (2012.01)

(52) U.S. Cl.
CPC ............ *E21B 49/006* (2013.01); *G01L 1/243* (2013.01); *G01N 21/47* (2013.01); *G01N 2021/4735* (2013.01)

(56) References Cited

U.S. PATENT DOCUMENTS

| | | | |
|---|---|---|---|
| 4,733,567 A | 3/1988 | Serata | |
| 4,838,349 A * | 6/1989 | Berzin | E21B 17/18 166/187 |
| 5,253,519 A * | 10/1993 | Muschotti | E02D 1/022 73/152.52 |
| 5,353,637 A | 10/1994 | Plumb et al. | |
| 5,576,485 A | 11/1996 | Serata | |
| 5,675,088 A * | 10/1997 | Serata | E21B 33/1277 166/207 |
| 7,245,791 B2 | 7/2007 | Rambow et al. | |
| 7,513,167 B1 | 4/2009 | Serata | |
| 8,515,675 B2 * | 8/2013 | Stoesz | E21B 49/006 702/6 |
| 9,321,222 B2 | 4/2016 | Childers et al. | |
| 2003/0173072 A1 * | 9/2003 | Vinegar | B09C 1/02 166/66.5 |
| 2004/0045705 A1 * | 3/2004 | Gardner | E21B 43/26 166/250.01 |
| 2005/0194184 A1 * | 9/2005 | Gleitman | E21B 49/003 175/45 |
| 2007/0289741 A1 | 12/2007 | Rambow | |
| 2009/0236101 A1 * | 9/2009 | Nelson | E21B 4/18 166/382 |
| 2009/0289808 A1 * | 11/2009 | Prammer | E21B 47/07 340/853.7 |
| 2010/0206548 A1 * | 8/2010 | Pisio | E21B 49/008 166/101 |
| 2010/0254650 A1 | 10/2010 | Rambow | |
| 2012/0018167 A1 | 1/2012 | Konopczynski et al. | |
| 2013/0154846 A1 * | 6/2013 | Mangione | G01S 13/885 340/854.6 |
| 2013/0186688 A1 * | 7/2013 | Rasmus | E21B 21/08 175/48 |
| 2013/0300571 A1 * | 11/2013 | Mohamadi | E21B 47/10 340/854.6 |
| 2014/0118740 A1 * | 5/2014 | Fontaine | G01L 1/241 356/364 |
| 2015/0128692 A1 | 5/2015 | Chen et al. | |
| 2015/0146759 A1 | 5/2015 | Johnston | |
| 2015/0177411 A1 * | 6/2015 | Childers | G01V 8/12 250/269.1 |
| 2015/0233236 A1 * | 8/2015 | Johnston | E21B 47/123 73/152.16 |
| 2016/0146962 A1 | 5/2016 | Hayward | |
| 2016/0274064 A1 | 9/2016 | Wysocki et al. | |
| 2016/0319661 A1 * | 11/2016 | Mayerhofer | G01V 8/02 |
| 2017/0010385 A1 * | 1/2017 | Englich | G01D 5/35303 |
| 2017/0138187 A1 | 5/2017 | Moronkeji et al. | |
| 2017/0167249 A1 * | 6/2017 | Lee | E21B 47/123 |
| 2017/0261637 A1 * | 9/2017 | Wilson | G01V 3/26 |
| 2018/0202281 A1 * | 7/2018 | Leblanc | E21B 47/005 |
| 2019/0186250 A1 * | 6/2019 | Burger | E21B 43/295 |
| 2019/0242210 A1 * | 8/2019 | Krieg | E21B 47/06 |
| 2019/0330981 A1 * | 10/2019 | Lei | E21B 47/002 |

OTHER PUBLICATIONS

C. Ljunggren et al, "An overview of rock stress measurement methods" *International Journal of Rock Mechanics & Mining Sciences*, vol. 40, accepted Jul. 20, 2003, pp. 975-989.

U.S. Department of Energy Subsurface Technology and Engineering RD&D Crosscutting Team, "Subsurface Control for a Safe and Effective Energy Future" SubTER Crosscut White Paper, 2014, 9 pages.

O. Sano et al, "Review of Methods of Measuring Stress and its Variations" *Bulletin of the Earthquake Research Institute*, University of Tokyo, vol. 80, Jan. 2005, pp. 87-103.

Luna white paper, "In-situ Stress Rock Fracture Sensing with HD-FOS" Oct. 7, 2016, 7 pages.

S. Serata et al, "Double fracture method of in situ stress measurement in brittle rock" *Rock Mechanics and Rock Engineering*, 25(2), pp. 89-108, Apr. 1992.

R. Chen et al, "High resolution monitoring of strain fields in concrete during hydraulic fracturing processes" *Optics Express*, vol. 24, No. 4, Feb. 17, 2016, 9 pages.

* cited by examiner

Single Extended Length Sensor Assembly- 33

Multiple Sensor Assemblies Concatenated - 34

| Depth | Min. Stress | Min. Stress Direction | Max. Stress | Max. Stress Direction | Modulus | Additional Property |
|---|---|---|---|---|---|---|
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |
| ... | ... | ... | ... | ... | ... | ... |

Fig. 13

DISTRIBUTED MEASUREMENT OF MINIMUM AND MAXIMUM IN-SITU STRESS IN SUBSTRATES

CROSS-REFERENCES TO RELATED APPLICATIONS

This application claims priority from U.S. provisional patent application 62/551,419, filed on Aug. 29, 2017, the contents of which are incorporated herein by reference.

STATEMENT REGARDING FEDERALLY SPONSORED RESEARCH OR DEVELOPMENT

This invention was made with government support under contract DE-SC0015129 awarded by the Department of Energy. The government has certain rights in the invention.

TECHNICAL OVERVIEW

The technology described in this application relates to in-situ stress measurements of a substrate. More particularly, the technology described herein relates to high-definition fiber optic sensing technology that provides high spatial resolution strain measurements necessary to determine the in-situ stress in the substrate.

INTRODUCTION

A substrate is defined as a solid structure of sufficient thickness and hardness that it develops fractures when placed under sufficient pressure or force. Examples of a substrate are the earth's subsurface and other rock formations. Another example of a substrate is a floor, road, or structural member such as a concrete floor, bridge, or dam. Subsurface formations are used below as an example substrate for illustration purposes only.

Presently, there is insufficient understanding of subsurface stress, human-induced seismicity, and their combined effects on permeability. Higher fidelity sensing of the subsurface allows for development of geo-mechanical models that can guide well design to minimize cost and maximize safety. There is a need for new ways to measure the in-situ stress state over a wide range of measurement scales (e.g., $10^{-6}$ to $10^2$ m) and at significant depths (e.g., up to 5 km). This new measurement data would be useful for many specific example applications such as underground structure stability, excavation design, rock support, rock burst prediction, rock behavior models, grout design, fluid flow, and fracturing, as well as to other applications involving in-situ stress measurement inside a substrate. The stress sensing technology described in this application provides benefits to multiple sectors within the energy industry including energy production, energy storage, and the safe disposal of hazardous materials such as:

Oil and gas—enabling risk-driven adaptive controls on injection rate, volumes, pressures, and well locations.

Hydraulic fracturing—prediction and control of hydraulic induced fractures and the activation/reopening of faults.

Geothermal—develop theoretical and experimental models relating stress and induced seismicity.

Waste disposal—improved understanding of stresses that will act on deep disposal facilities for energy related waste products.

SUMMARY

At least some examples provide an apparatus for performing distributed stress measurements along a hole in a substrate, comprising: an expandable element configured to be inserted into a hole in a substrate; an optical fiber sensor integrated with the expandable element to expand and contract as the expandable element expands and contracts; a fiber optic interrogator to provide light to the optical fiber sensor and to detect reflected light from the optical fiber sensor; a pressurizing device coupled to the expandable element for expanding the expandable device when the expandable element is inserted in the hole in the substrate to exert pressure on a wall of the hole; a pressure sensor to provide a sensor output indicative of a pressure applied to the wall of the hole by the expandable element; processing circuitry, when the expandable element is inserted in the hole in the substrate, configured to: (a) control pressure delivered by the pressurizing device to expand the expandable element until one or more fractures are detected as being in an open state in the substrate and to contract the expandable element until the one or more fractures are detected as being in a closed state in the substrate; and (b) process, during the expansion and contraction of the expandable element, light reflected from the optical fiber sensor to detect an occurrence of an event associated with each of the one or more fractures in the substrate and the sensor output associated with each event to determine one or more of the following: (i) a direction associated with each of the one or more fractures, and (ii) a stress at each of multiple locations along a length of the wall of the hole including a stress associated with each of the one or more fractures; and (iii) generate output information based on the direction and stress of each of the fractures.

In some examples, the processing circuitry is configured to determine strain values along a length of the wall of the hole from light reflected from the optical fiber sensor while the expandable element is being pressurized, and determine occurrence of an event associated with a fracture in the open state when one of the strain values exceeds a predetermined value.

In an example embodiment, the processing circuitry is configured to control pressure delivered by the pressurizing device up to a breakdown pressure to expand the expandable element until a first fracture is detected as being in the open state in the substrate to determine a direction of the first fracture. Then, the processing circuitry is configured to control pressure delivered by the pressurizing device to contract the expandable element until a first fracture is detected as being in the closed state and then to expand the expandable element until the first fracture is detected as again being in the open state to determine a minimum stress associated with the first fracture in the open state. The processing circuitry is configured to then control pressure delivered by the pressurizing device up to a breakdown pressure to expand the expandable element until a second fracture, different from the first fracture, is detected as being in the open state in the substrate to determine a direction of the second fracture. The processing circuitry is configured to control pressure delivered by the pressurizing device to contract the expandable element until the second fracture is detected as being in the closed state and then to expand the expandable element until the second fracture is detected as again being in the open state to determine a maximum stress associated with the second fracture.

In some example cases, the optical fiber sensor is located below a surface of the expandable element. Alternatively, the optical fiber is located on a surface of the expandable element. In some examples, the optical fiber is helically wrapped around or within the expandable element.

The pressurizing device may, for example, be a hydraulic pump.

In some applications, the processing circuitry is configured to control pressure delivered by the pressurizing device to expand the expandable element and to determine a mechanical property of the substrate including an elastic modulus of the substrate.

In some examples, the fiber optic interrogator is an optical frequency domain reflectometry (OFDR) system for providing coherent light over a range of wavelengths to the optical fiber sensor and detecting reflected light from the optical fiber sensor. The optical frequency domain reflectometry (OFDR) system is capable of detecting sensor strain events with a spatial resolution of approximately 1 mm. When the sensor optical fiber helically wrapped on the surface of the expandable element, the fracture direction may be determined with an angular resolution around the circumference of the hole in a range of 90°-0.1° for a range of realizable hole sizes.

In some examples, the processing circuitry is configured to calibrate the pressure sensor output to indicate the pressure applied to the wall of the hole by the expandable element.

Some examples use multiple expandable elements coupled together in series, where the optical fiber sensor is integrated with each expandable element.

The expandable element may have various configurations including an expandable element with a hollow inside and along a length of the expandable element or an expandable element includes a solid rod or a hollow pipe inside and along a length of the expandable element.

Other examples include one or more of the following in the list including one or more acoustic sensors and one or more orientation sensors associated with the expandable element.

Some examples provide a method of performing distributed measurements along a hole in a substrate, comprising inserting an expandable element into a hole in a substrate, where an optical fiber sensor is integrated with the expandable element to expand and contract as the expandable element expands and contracts; providing light to the optical fiber sensor; detecting reflected light from the optical fiber sensor; expanding the expandable device to exert pressure on a wall of the hole; generating a sensor output indicative of the pressure on the wall of the hole exerted by the expandable element; controlling pressure delivered by the pressurizing device to expand the expandable element until one or more fractures are detected as being in an open state in the substrate and to contract the expandable element until the one or more fractures are detected as being in a closed state in the substrate; processing, during the expansion and contraction of the expandable element, light reflected from the optical fiber sensor to detect an occurrence of a sensor strain event associated with each of the one or more fractures in the substrate and the sensor output associated with each sensor strain event to determine one or more of the following: (i) a direction associated with each of the one or more fractures, and (ii) a stress at each of multiple locations along a length of the wall of the hole including a stress associated with each of the one or more fractures; and (iii) generating output information based on the direction and stress of each of the fractures.

Further aspects, features and advantages of the technology in this application will be apparent from the following description of examples, which is to be read in conjunction with the accompanying drawings.

BRIEF DESCRIPTION OF THE DRAWINGS

FIG. 13 shows an example table of output information obtained using the sensor assembly for storage in a data file (e.g., a log) and/or displayed on a display.

DETAILED DESCRIPTION

Figure 1:
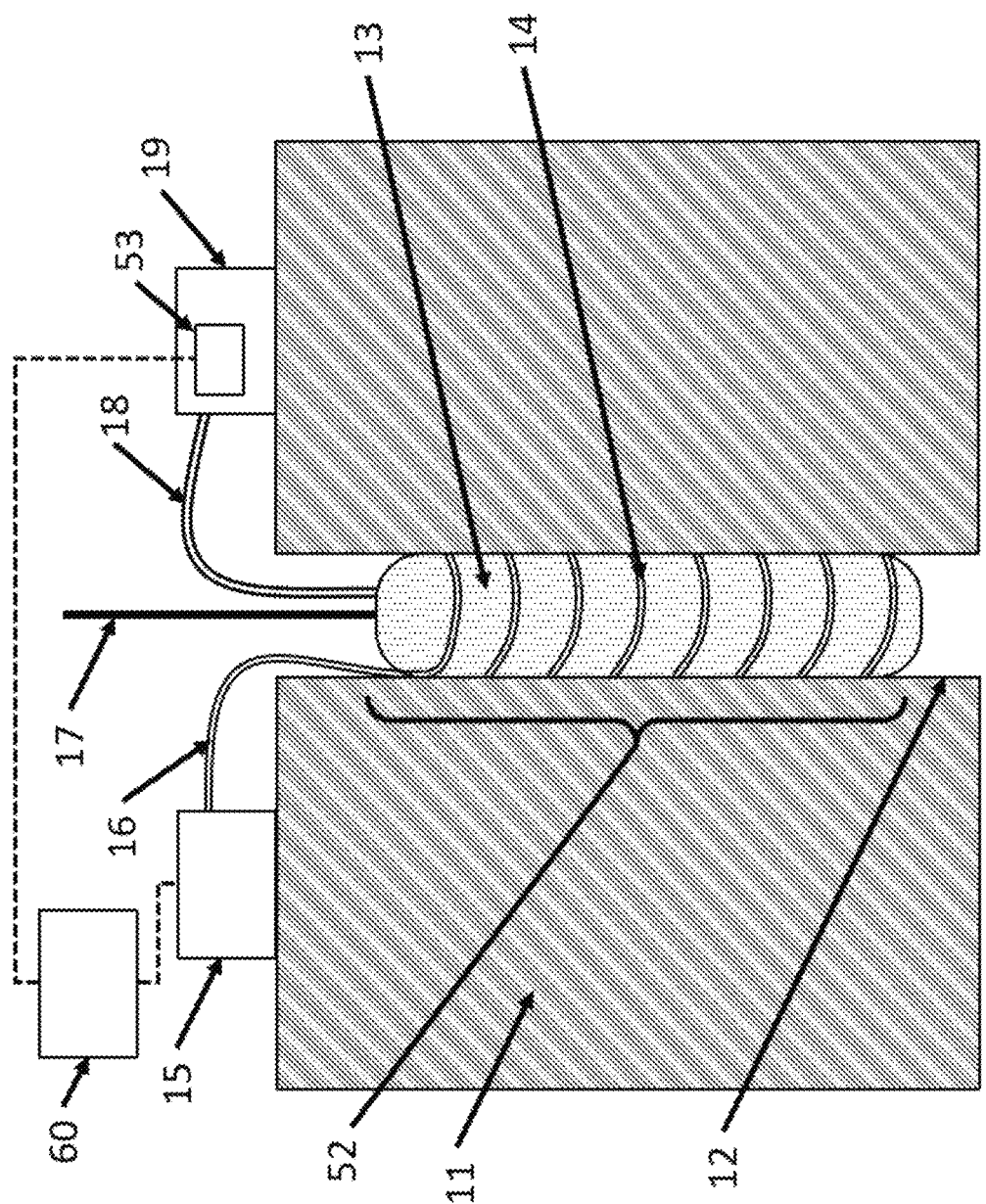
FIG. 1 is a function block diagram of an example sensing apparatus deployed in a hole of a substrate.

In the following description, for purposes of explanation and non-limitation, specific details are set forth, such as particular structures, nodes, functional entities, techniques, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

The example apparatus and methods described herein provide for measuring in-situ stress in a substrate via a hole, e.g., a borehole. In-situ stress is the stress state of the substrate before a hole is made in the substrate. Example embodiments incorporate a distributed fiber optic strain sensor integrated with an expandable element that can apply pressure to the hole wall. The fiber optic sensor can be used to monitor expandable device strain, temperature, acoustic emissions, transverse strain and/or pressure. The fiber optic sensor measures the deformation of the expandable element, and when the expandable element is engaged with the hole wall, exhibits a strain response that indicates one or more fractures that occur in the hole wall. The initiation of a fracture, the location and direction of a fracture, and the magnitude of a fracture may all be detected using the fiber optic sensor. The "distributed" nature of the fiber optic sensor means that many independent measurements of stress associated with one or more fractures over a length of the hole can be attained through a single fiber optic sensor or an array of fiber optic sensors.

Compared to hydraulic fracturing techniques to measure rock stress (henceforth referred to as "mini-fracturing" but also known as mini-fracking, micro-fracking, micro-fracturing, etc.), where fluid is injected into an isolated section of borehole until fractures occur and the fluid flows into the fractures, the technology described in this application does not allow fluid to penetrate into the fractures or subsurface formation. In addition, the technology described in this application does not need to seal or isolate sections of borehole like the hydraulic mini-fracturing technique. Instead, the expandable element used in the technology described in this application is pressurized to directly press on the hole wall until fractures occur and in-situ stress can be assessed. Unlike hydraulic fracturing, the agent used to pressurize the expandable element does not escape the element and enter the fracture. Hydraulic mini-fracturing can only measure minimum in-situ stress, while the technology described in this application can measure minimum and maximum principal in-situ stress of the substrate. In hydraulic fracturing, it is impractical to continue to pressurize the hole after the fracture that defines the minimum stress conditions forms because the pressurizing agent leaks into the surrounding formation through the fractures in the borehole wall.

An example embodiment of an apparatus to perform in-situ stress measurement of a substrate 11 via a hole 12 is depicted in FIG. 1. As one example application, a borehole is drilled in rock for the purpose of extracting water, liquid or gaseous hydrocarbons, or other gasses or liquids in the geologic formation; or for injection of disposal liquids or gasses; or to pressurize a formation. The substrate, however, may also be a man-made building material like concrete, or compacted gravel, sand, or clay. The hole could be intentionally drilled, or made when the substrate is fabricated, or naturally occurring.

The apparatus includes components that include an expandable element 13 integrated with (e.g., attached to the surface of or embedded in) at least one fiber optic sensor 14 which together form a sensor assembly 52, a fiber optic interrogator instrument 15, a pressurizing device 19, e.g., a hydraulic pump, pressure lines 18, or included in a mechanical connection 17 (e.g., pipes or a wireline system) to the surface of the substrate for lowering and positioning the sensor assembly 52 in the hole. The pressurizing device 19 may include a pressure sensor 53. A pressure sensor may alternatively or in addition be included in the pressure lines 18, in the expandable element 13, or incorporated in the fiber optic sensor 14 and be connected to a pressure monitor. The pressure monitor may be incorporated in the fiber optic sensor interrogator instrument 15. Processing circuitry 60 collects data from the pressure sensor 53 and fiber optic interrogator 15 to calculate in-situ stress and any other quantities of interest associated with the substrate. The processing circuitry 60 may also send and receive control and other information signals to/from the pressurizing device 19 and/or the fiber optic interrogator 15. Non-limiting examples of the expandable element may include packers or hydraulic sleeves. The length of the sensor assembly 52 may be adapted to the environment and application and permits measurement of in-situ stress over a range of depths, e.g., 0.1-1000 meters, in a single operation.

Although the optical fiber sensor may be embedded in the expandable element, in the example in FIG. 1, the fiber optic sensor is attached to the surface of the expandable element in a helically wrapping pattern. However, other patterns of applying or embedding the fiber optic sensor could be used to detect fractures and perform in-situ stress measurements. The measurement length of optical fiber may be attached to the expandable element for example by adhesive, run within a groove on the exterior of the expandable element, or as indicated above, embedded in the material of the expandable device. The fiber optic sensor may be covered by a protective coating, layer, or sleeve to protect it from damage due to contact with the hole wall. The thickness and elastic modulus of material between the fiber sensor and the outside edge of the expandable element influences the spreading of the strain fields between the hole wall and the sensor. Some spreading is helpful to reduce maximum strain and strain gradients on the fiber sensor, but not so much that the ability to resolve multiple nearby fractures along the hole circumference is compromised. Generally, the efficiency of the strain transfer from the hole wall to the sensor diminishes as the thickness of the material in-between is increased or as the elastic modulus is decreased. The transfer efficiency may be estimated from a model incorporating the sensor assembly 52 geometry and material properties, or measured directly with a carefully designed experiment that measures strain at both the sensor and a simulated hole wall.

For helically-wrapped fiber embodiments, there may be a helical wrap angle that minimizes strain on the optical fiber as the expandable element increases in diameter as it expands. This may be the case when the expandable element contracts axially while expanding radially. Under these conditions, a helical wrap angle may be determined that imparts no strain, or a targeted value of strain, to the fiber while the expandable element is expanding. This feature allows the expandable element to change diameter without approaching a maximum elongation of the optical fiber sensor before breakage.

The pressure input to the expandable element from the pressurizing device 19 is measured by the pressure sensor 53 but is not necessarily the same as the pressure applied to the hole wall 12. However, the pressure applied to the hole wall 12 is preferably used in determining in-situ stress in the substrate. To convert the pressure input to the expandable element to the pressure applied to the hole wall 12, a calibration procedure may be performed to generate a relationship, curve fit, or calibration curve relating the input pressure from the pressurizing device 19 to the actual pressure applied to the hole wall 12. In an example embodiment, this calibration may be performed by pressurizing the expandable element in a pipe instrumented with strain sensors. The strain of the pipe can be related back to the applied pressure using calculations of hoop stress in cylindrical structures.

The fiber optic sensor 14 used in the sensing assembly 52 is a distributed sensor that measures multiple data points of strain along the fiber in a single measurement. This can be accomplished through the use of Rayleigh backscatter, Brillion scatter, fiber Bragg gratings, and/or enhanced scattering patterns with distributed spatial distribution created by modulating the core geometry, refractive index profile, or doping profile. The spacing between measurement data points preferably, but not necessarily, is small enough to obtain multiple data points per revolution period of the fiber helically wrapping on the expandable device. The measurement is preferably fully continuous or semi-continuous so that the measurement of adjacent points is sensitive to changes in the fiber without any gap where sensitivity falls to zero, or if there is a gap in between sensing elements, that gap is smaller than the minimum width of the strain distribution associated with a fracture in the substrate. High-resolution strain sensing is preferable to more accurately determine the direction of the fracture relative to the sensor assembly, and to distinguish between fractures associated with minimum and maximum hole stress. Without sufficient resolution, and without sufficiently continuous sensing element distribution, a fracture may go unobserved, or the accuracy of the direction sensed may have significant uncertainty, or new fractures associated with the maximum hole stress will not be distinguishable from already existing fractures associated with minimum hole stress.

In some example embodiments, the fiber optic sensor interrogator instrument is based on optical frequency domain reflectometry (OFDR) and the fiber optic sensor returns light to the interrogator via Rayleigh scatter. As a specific example, the Luna ODiSI fiber optic sensing interrogator can record fiber strain with sensor elements spaced every 0.65 mm along the sensor, and with each sensor element comprising light scattering back over a 1.3 mm length, so that each sensing element has substantial overlap with each adjacent point. For a hole diameter of 40 mm, this OFDR example system may collect at least 193 measurements around one period of the helix of a helically-wrapped, fiber optic sensor. Having a measurement spatial resolution considerably smaller than the hole circumference is beneficial in characterizing the occurrence, magnitude, and direction of fractures with respect to the hole.

The fiber optic sensor 14 includes an optical fiber with a core, cladding, and a protective coating. Optical interferometric measurements on the sensor fiber can be made to determine the Rayleigh scatter reflection amplitude and phase as a function of distance along the sensor fiber. Rayleigh scatter is a random but stable pattern of reflections inherent to each fiber as a result of small-scale non-homogeneities. This random pattern of reflections is unique to each fiber and constant for the life of the fiber. Strain results in an apparent stretching of this pattern, which translates to a shift in the spectral content of the pattern. Alternatively, the fiber optic sensor may be inscribed with a series of fiber Bragg gratings (FBGs) which correspond to a periodic modulation of the core index of refraction which produces an enhanced back reflection at the resonance wavelength of the grating. Arrays of low reflectivity FBGs inscribed on a fiber can also provide a near-continuous alternative to sensing with Rayleigh scatter, and OFDR interrogators may to use either or both. Generally, a fiber optic sensor inscribed with FBG arrays is significantly more costly than fiber suited for Rayleigh scatter sensing, but the narrow-band nature and higher reflectivity of FBGs can give noise, acquisition rate and vibration immunity performance benefits.

OFDR, used to interrogate each fiber optic sensor, is an interferometric technique which can distinguish the sensor fiber's complex reflection profile as a function of distance along the fiber. Light from a swept tunable laser is split between a measurement path and a reference path by a fiber optic coupler or circulator. Light in the measurement path is sent to the fiber optic sensor. Light reflected from the sensor returns through the coupler or circulator and is combined with light from the reference path, after which point the light from measurement and reference paths may interfere. This combined signal then passes through a polarization beam splitter, which splits the light into orthogonal polarization states recorded at the optical detectors. Reference path light is split between the outputs of the polarization beam splitter so that the detectors will be sensitive to any polarization state returned from the sensor path. A Fourier transform of these interferometer signals yields the sensor reflection phase and amplitude profile as a function of length along the sensor.

To calculate strain from the sensor Rayleigh scatter reflection profile, the spectral content of the sensor is compared between a measurement and reference state. The complex reflection profile data is windowed around a desired measurement location, referred to as a gage. This window length determines the spatial resolution of the strain measurement. An inverse Fourier transform of the windowed data gives the spectral content from a particular gage in the sensor, which is cross-correlated with the spectrum from the same location of the sensor in a baseline reference state. The cross-correlation peak is detected, and the peak shift is converted to strain using an empirically determined calibration coefficient, or gage factor, analogous to that of the electrical strain gage. This process is repeated along the length of the sensor for multiple measurement points that form a distributed measurement.

In a similar manner, OFDR can measure the distributed reflection amplitude and phase profile from an array of FBGs and identify the spectral shift of sub-elements of the array between a measured state and a reference state. The reflected spectrum as a function of wavelength is calculated by windowing the FBG complex reflection profile at the gage location and performing an inverse Fourier transform. The amplitude of the resulting data is the reflected spectrum of the windowed grating. A "peak find" routine may be used to determine the spectral shift of the individual grating, and the spectral shift may be converted to strain using the same gage factor as for the Rayleigh backscatter.

The length of the sensor that the OFDR interrogator can support is determined by the interrogator's sampling rate, the laser tuning rate, and the sensor's group index of refraction. An individual sensor may be one meter to tens of meters in length, but sensor lengths up to 800 meters have been demonstrated. The sampling resolution of the complex reflection profile along the length of the optical fiber sensor is proportional to the inverse of the optical frequency range of the laser scan. A sampling resolution of less than 0.01 mm has been demonstrated. The sensor gage formed by binning multiple sampled points together is typically formed from at least several dozen contiguous sampled points, allowing OFDR fiber optic sensing systems to make strain measurements with spatial resolution of less than 1 mm.

Other fiber optic distributed sensing interrogation methods and sensor scattering mechanisms may also be used to acquire the distributed fiber sensor strain profile necessary to detect fracture occurrence and localize it along the fiber sensor path. For example, an instrument based on an interrogator technique called Pulse-Pre-Pump Brillouin Optical Time Domain Reflectometry (PPP BOTDR) is capable of sensing strain with minimum spatial resolution of 2 cm over a 500 m range. Likewise, an instrument based on an interrogator technique called Tunable Wavelength Coherent Time Domain Reflectometry (TW-COTDR) may be used to read the distributed Rayleigh scatter reflection profile; this technique also is capable of sensing strain with minimum spatial resolution of 2 cm over a 500 m range. Substantially broader minimum spatial resolution, however, makes these techniques less desirable compared to OFDR based Rayleigh scatter or FBG sensing.

Moreover, fracture location can be determined by other mechanical manifestations in the optical fiber sensor. The opening of a fracture could induce a localized change in the transverse stress, and/or isotropic pressure, on the optical fiber. Localized transverse stress variations would change the local birefringence of the sensor fiber, and polarization sensitive OFDR or OTDR interrogation techniques are able to measure the optical fiber birefringence distribution. If the sensor fiber is a polarization maintaining fiber, localized changes of fiber transverse stress could cause polarization state cross-over, and polarization sensitive OFDR or OTDR interrogation techniques can measure distributed polarization state cross-over. Polarization sensitive OFDR or OTDR interrogation techniques that can measure the optical fiber birefringence distribution can also make localized isotropic pressure measurements if the fiber had air holes in the cladding (known as side-hole fiber), which can also indicate fracture location. However, polarization sensitive interrogation techniques are generally more complex and costly, and polarization maintaining fiber and side hole fiber sensors are more costly, and techniques based on transverse stress and pressure are less sensitive to fractures, so using fiber optic distributed strain sensing to identify fractures may be a preferred implementation in some applications.

Figure 2:
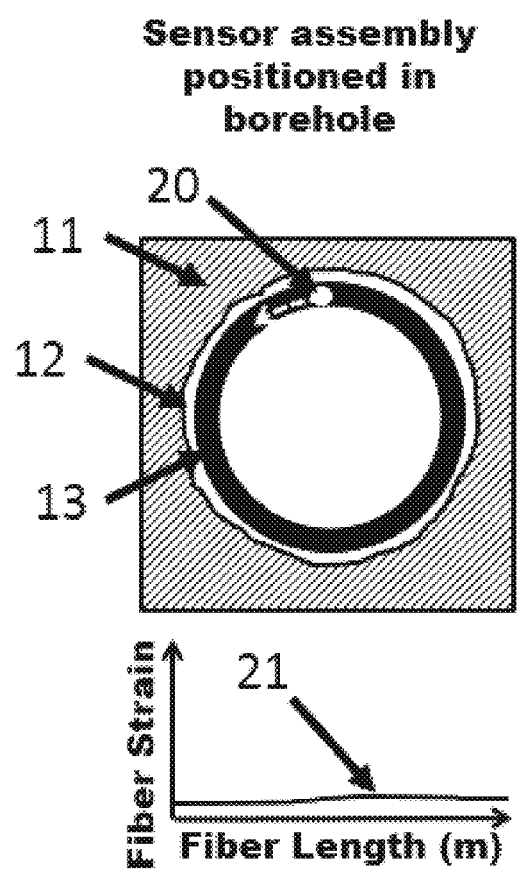
FIG. 2 is a cross-section view of the sensor assembly in FIG. 1 positioned in a hole.

An example showing how minimum and maximum in-situ stress may be determined is depicted in FIG. 2 through FIG. 6. FIG. 2 shows a cross-section of the sensor assembly 52. Initially, the sensor assembly 52 is inserted in a hole at any suitable depth, and a distributed strain measurement 21 by the fiber optic sensor is made. This distributed strain measurement 21 is used as a baseline condition.

Figure 3:
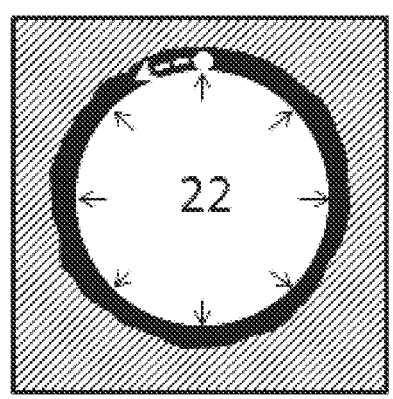
FIG. 3 is a cross-section view of the sensor assembly in FIG. 1 being expanded to engage the hole wall.
Figure 3:
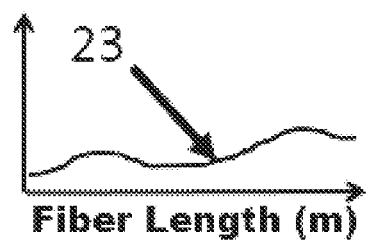

FIG. 3 depicts an initial pressurization of the expandable element 13 to expand and meet the hole wall. A pressurizing agent (such as water, oil, air, or some other suitable gas or liquid) is supplied to the expandable element 13 to apply an internal pressure 22 that causes a radial expansion of the expandable element 13. The embedded or surface-mounted fiber optic sensor 14 and optical interrogator 15 measure the strain of the expandable element, and a distributed strain signal 23 is stored in memory (e.g., in the processing circuitry 60) for this state and position of the sensor assembly 52 in the hole. The strain signal may indicate that the hole is curved, has a rough surface, or is not circular because local variation in the radius of curvature of the wall of the expanded element cause discernable features in the strain distribution.

Figure 4:
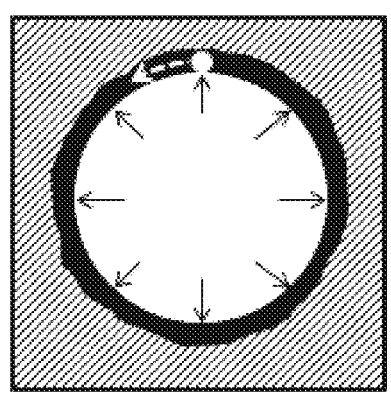
FIG. 4 is a cross-section view of the sensor assembly in FIG. 1 being pressurized to measure the mechanical properties of the substrate.
Figure 4:
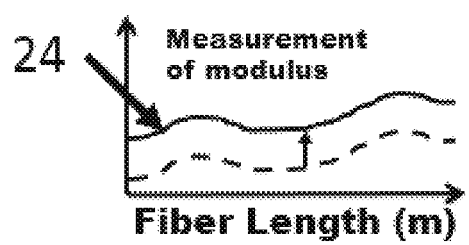

FIG. 4 depicts further pressurization of the sensor assembly 52 and the elastic deformation of the substrate before fracture. A distributed strain signal 24 is stored in memory for this condition and may be used by the processing circuitry 60 to calculate the elastic, shear, and/or bulk modulus of the substrate by correlating the amount of deformation of the hole to the radial pressure applied.

Figure 5:
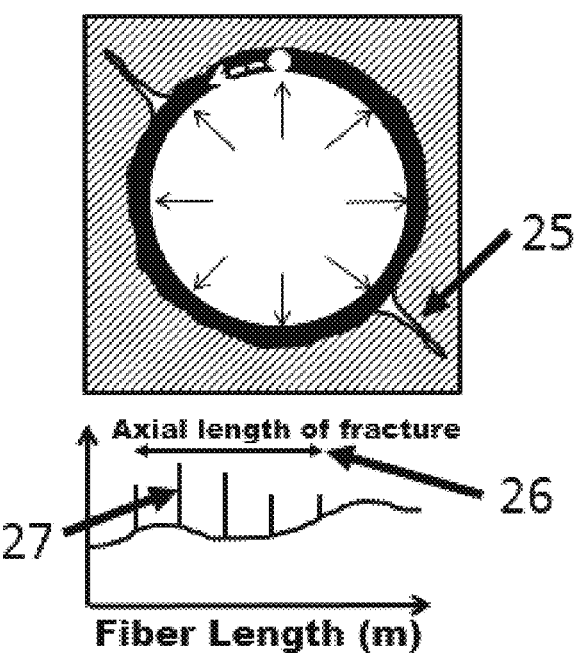
FIG. 5 is a cross-section view of the sensor assembly in FIG. 1 creating a first fracture that corresponds to a minimum in-situ stress of the substrate.

FIG. 5 depicts further pressurization until a fracture 25 occurs at the hole wall in an open state. The fracture 25 is typically perpendicular to the minimum principal in-situ stress in the substrate and parallel to the maximum principal stress direction. This open state fracture 25 occurs at a "breakdown" stress or pressure, which is higher than the in-situ stress. The substrate fractures in this direction first because this direction is under less compression than in the maximum principal direction.

In one example, a vertical borehole in a geological formation has two vertical fractures that run along the side of the borehole on opposite sides. For an example embodiment with a helically-wrapped optical fiber sensor, the sensor intersects fractures twice per revolution around the borehole. The distributed strain signal detected by the interrogator 15 will have distinct peaks in strain 27 at the locations of these intersections. The mapping of the fiber optic sensor 14 to the expandable element 13 geometry determines the axial location (along the length axis of the expandable element and the borehole) of the fracture and the polar angle of the fracture.

The polar angle of the fracture directions is derived from the relative phase angle of these strain peaks between the start and end locations of each revolution of 360°. Dividing 360° by the number of strain sensing points of the fiber optic sensor per revolution determines a polar angle resolution that can be detected in terms of measurement data points. For instance, 500 strain data points per revolution of fiber optic sensor wrapping corresponds to a 0.72° angular resolution.

The location of the data points within the wrapping period of the fiber 14 around the element 13 corresponding to fracture locations are used to calculate the direction of the fractures relative to the sensor assembly 52, which can be related to an absolute coordinate frame of reference. The direction of a fracture relative to the sensor assembly 52 may be calculated (taking into account whether the wrapping is clockwise or counterclockwise as the fiber proceeds down the length of the expandable element 13 while viewing from above) as the "index" (the number of the item within an ordered set or array of items) of the data point at the strain peak (identified as the local maximum by a peak finding algorithm), minus the index of the beginning of the wrapping period, with the resulting difference divided by the number of strain sensing points of the fiber optic sensor per revolution (period). The quotient is then multiplied by 360°.

An example calculation is now provided for illustration purposes. A fiber is wrapped with a clockwise orientation around expandable element 13, and a strain peak due to a fracture is detected at datapoint index 1187, while the beginning of the wrapping period in question is at index 1000. The number of points per period is 500, and the angular resolution is 0.72°. Consequently, the fracture has occurred at a polar angle of 134.6° relative to the sensor assembly 52. If the sensor assembly 52 is oriented vertically with the start of its wrapping period due north (0°), then the fracture direction would be substantially southeast (135°).

Strain peaks 27 in FIG. 5 occur where fractures have occurred, so the number of peaks in the strain signal is proportional to the axial length of the fracture 26 (axial length being measured along the length axis of the sensor assembly 52). This is significant because in-situ stress may vary in magnitude along the depth of the borehole, and this capability of the technology described in this application to sense the length of fractures that have opened can be used to identify the depth at which particular pressures reopen fractures. The minimum in-situ stress is determined by closing and reopening the fracture. To accomplish this, the processing circuitry 60 controls the pressurizing device 19 to decrease the pressure in the expandable element 13 until the fracture closes (a closed state) and is detectable in the distributed strain signal by the processing circuitry as the strain peak disappears or diminishes. Sometimes the peaks may not completely disappear but rather become small and unresponsive to further depressurization. Then, as the pressure is increased, a small peak may be detected indicating there is movement of the fracture opening. The processing circuitry 60 then controls the pressurizing device 19 to increase the pressure to expand the expandable element 13 until strain peaks at the known fracture locations reappear. The pressure at which each fracture reopens is stored by the processing circuitry 60 as the minimum in-situ stress at that location in the borehole. Repeated cycles may be employed to increase confidence in the minimum in-situ stress measurement.

Figure 6:
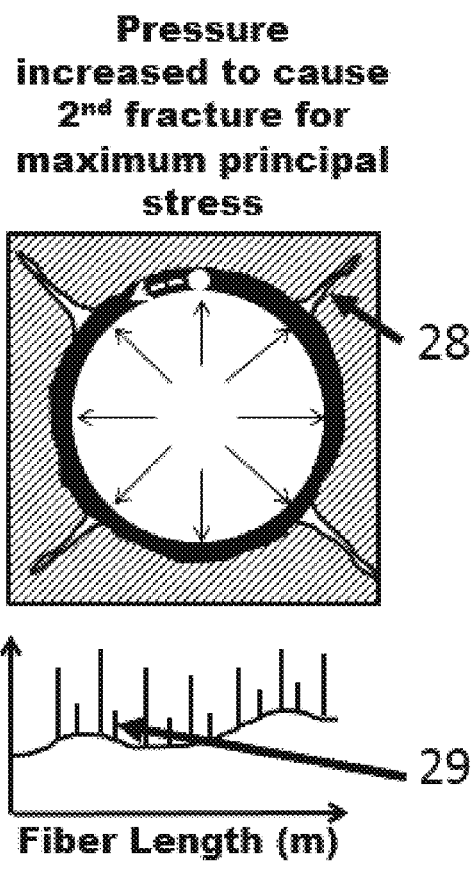
FIG. 6 is a cross-section view of the sensor assembly in FIG. 1 creating a second fracture that corresponds to a maximum in-situ stress of the substrate.

FIG. 6 depicts further pressurization of the expandable element 13 after the first fracture to produce a second fracture 28 in the open state. This second fracture (different from the first fracture) occurs at the breakdown stress or pressure for the maximum stress direction. The fracture is substantially perpendicular to the maximum principal in-situ stress direction and substantially parallel to the minimum principal stress direction. This is because, prior to the second fracture, the substrate was relatively more compliant in the minimum stress direction because the tensile strength of the substrate was no longer in effect, while the pressure from the expandable element was building up in the direction of the maximum stress until a fracture occurred. A distributed strain signal from the interrogator 15 is processed and stored by the processing circuitry 60 for this second fracture open state, and the processing circuitry 60 identifies in the distributed strain signal a second set of strain peaks 29 corresponding to fiber wrapping intersections with the second set of fractures 28 at intermediate angles in between the first set of fracture peaks. The relative phase angle of the second set of fracture peaks relative to the revolution period start and end locations determines the polar angle direction of the fracture measurement. In an ideal case, the angle between the first and second sets of fractures is 90°.

To determine maximum in-situ stress at this location along the borehole, the processing circuitry 60 controls the pressurizing device 19 to decrease the pressure to deflate the expandable element 13 to close the fractures and the corresponding strain peaks will disappear from the distributed strain signal. The processing circuitry 60 then controls the pressurizing device 19 to increase the pressure to expand the expandable element 13 until the processing circuitry 60 detects the reappearance of the strain peaks at the known locations of the fractures in the distributed strain sensing signal from the interrogator 15. The processing circuitry 60 stores this reopening pressure as the maximum in-situ stress individually for each peak in the strain signal, corresponding to an intersection of the sensing fiber with a fracture.

Figure 7A:
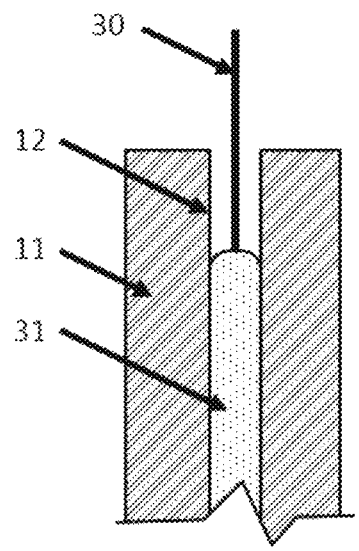
FIGS. 7A-7B depict example embodiments for extending the length of the measurement to provide a distributed measurement of in-situ stress versus the hole depth.
Figure 7A:
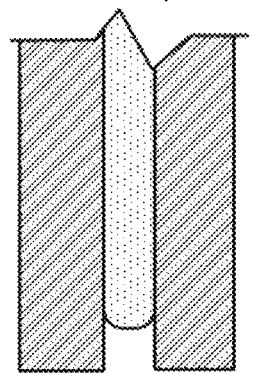

The distributed nature of this measurement technique can be shortened by making a shorter sensor assembly 52 (e.g., down to a length of only 0.1 m) or lengthened by making a longer sensor assembly 52 (e.g., up to several km). FIG. 7 depicts two example embodiments for increasing the length of a hole that can be interrogated in one sensing measurement using a sensor assembly. An example single sensor configuration shown in FIG. 7a can be lengthened to achieve a distributed measurement of a desired length. If the optical fiber sensor length, as determined by the length that the fiber optic sensor interrogator 15 can support, is not long enough to wrap around the entire length of the expandable device, then multiple fiber optic sensors could be used, and either interrogated in sequence with the same interrogation unit 15, or interrogated in parallel with multiple interrogation units.

Figure 7B:
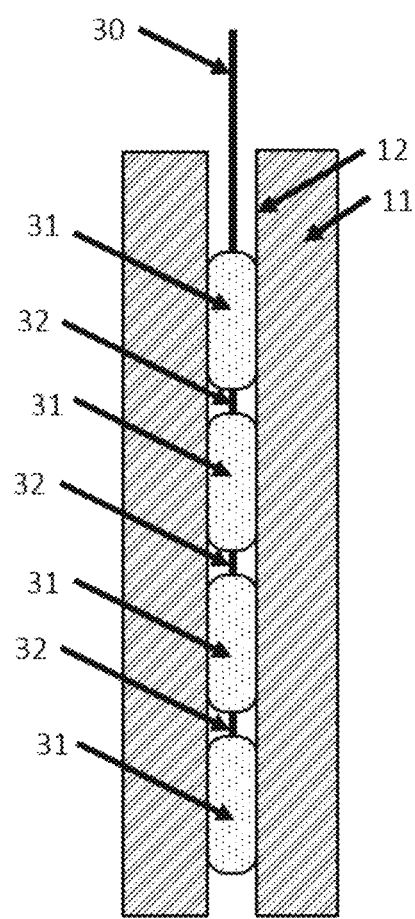

Another example embodiment shown in FIG. 7b includes multiple sensor assemblies concatenated together (daisy-chained) to attain the desired sensing length for a single distributed measurement. In this embodiment, the connection 30 from the sensor assembly to the surface includes communication, fiber optic, power, hydraulic pressure lines, and mechanical features to support the array of sensor assemblies 31. The modular connections 32 between sensor assemblies 31 provide connectivity for fiber optic, hydraulic pressure, and mechanical support.

Concerning spatial resolution of the in-situ stress measurements along the hole, an in-situ stress measurement is made at each intersection of the periodic fiber optic wrapping with a fracture. The spatial resolution of in-situ stress measurements along the hole is different than the spatial resolution of the distributed fiber optic strain sensor described above. In most cases, the substrate fracture passes completely through the hole (fracture openings on opposite sides of the hole), resulting in two fracture crossings per period of the fiber wrapping. Therefore, one half of the axial length of the wrapping period is the spatial resolution of the in-situ stress measurement per fiber optic sensor applied. To refine spatial resolution further while maintaining a fiber wrap period length, multiple fiber optic sensors may be wrapped (starting at different polar angles) along the same length of an expandable element (the spatial resolution is inversely proportional to the number of fibers wrapped). In one example embodiment evaluated experimentally, the spatial resolution of the distributed fiber optic strain spatial resolution was 1.3 mm while the spatial resolution of the in-situ stress was 0.15 m.

Figure 8D:
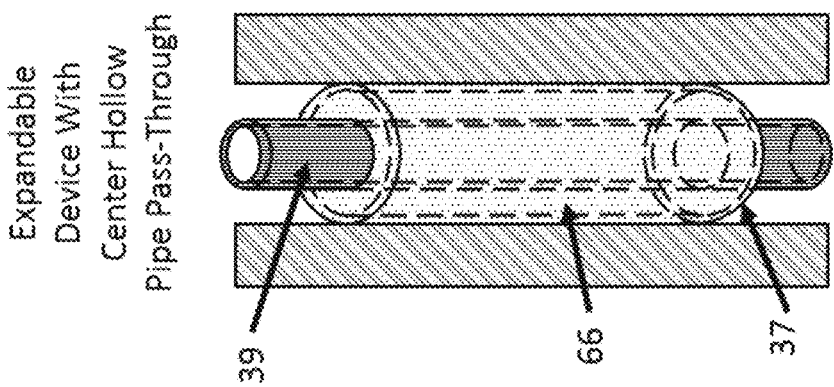
FIGS. 8A-8D depicts various example embodiments of an expandable device with integrated fiber optic sensor that can perform the method described herein.

The expandable element with integrated fiber optics can be implemented in many different ways. FIGS. 8a-8d show some example (non-exhaustive) embodiments. FIG. 8a shows a monolithic expandable element 35 with an internal cavity 66 that can be pressurized in a hole 12 within a substrate 11. FIG. 8b shows an expandable element with an annular sleeve 37 with an internal cavity 66 that can be pressurized and a pass-through 36, which allows for fluid in the hole to flow through the sensor assembly which means there is no need to seal or isolate sections of the hole. In addition hydraulic pressure lines, communication lines, or fiber optic sensing lines could pass through the sensor assembly via 36.

Figure 8C:
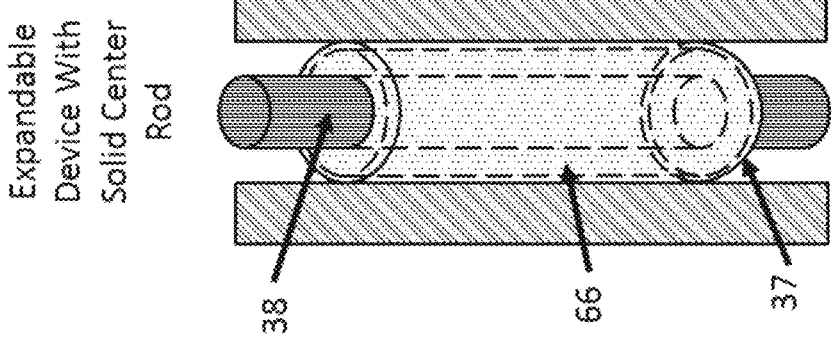
Figure 8B:
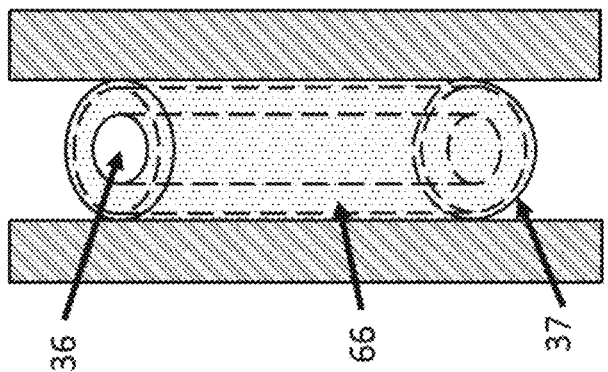
Figure 8A:
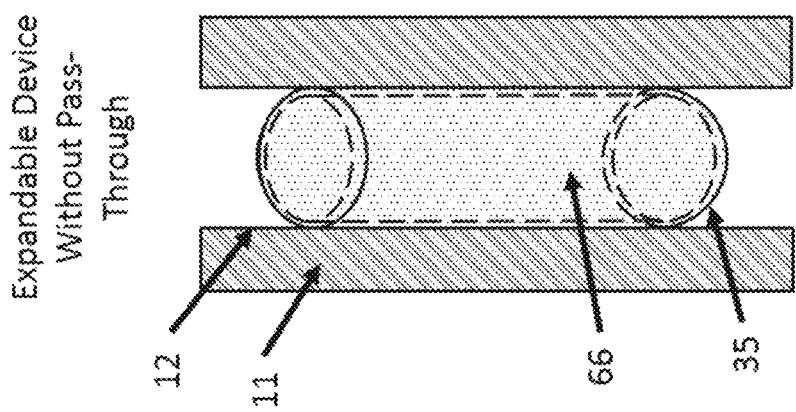

FIG. 8c shows an example embodiment with an expandable sleeve 27, with an internal cavity 66 that can be pressurized, around a solid rod 38 passing through the center of the sensor assembly. FIG. 8d shows an example embodiment with a hollow pipe 39 passing through the expandable sleeve 37 that has an internal cavity 66 that can be pressurized. The hollow pipe allows for rigid connection to the sensing assembly while also providing for pass through of mechanical, power, communication, hydraulic pressure lines, and/or fiber optic sensors through the expandable element. Pass-throughs, such as the examples in FIGS. 8b-8d, are particularly useful for concatenated arrays of sensors such as the example shown in FIG. 7b.

Figure 9:
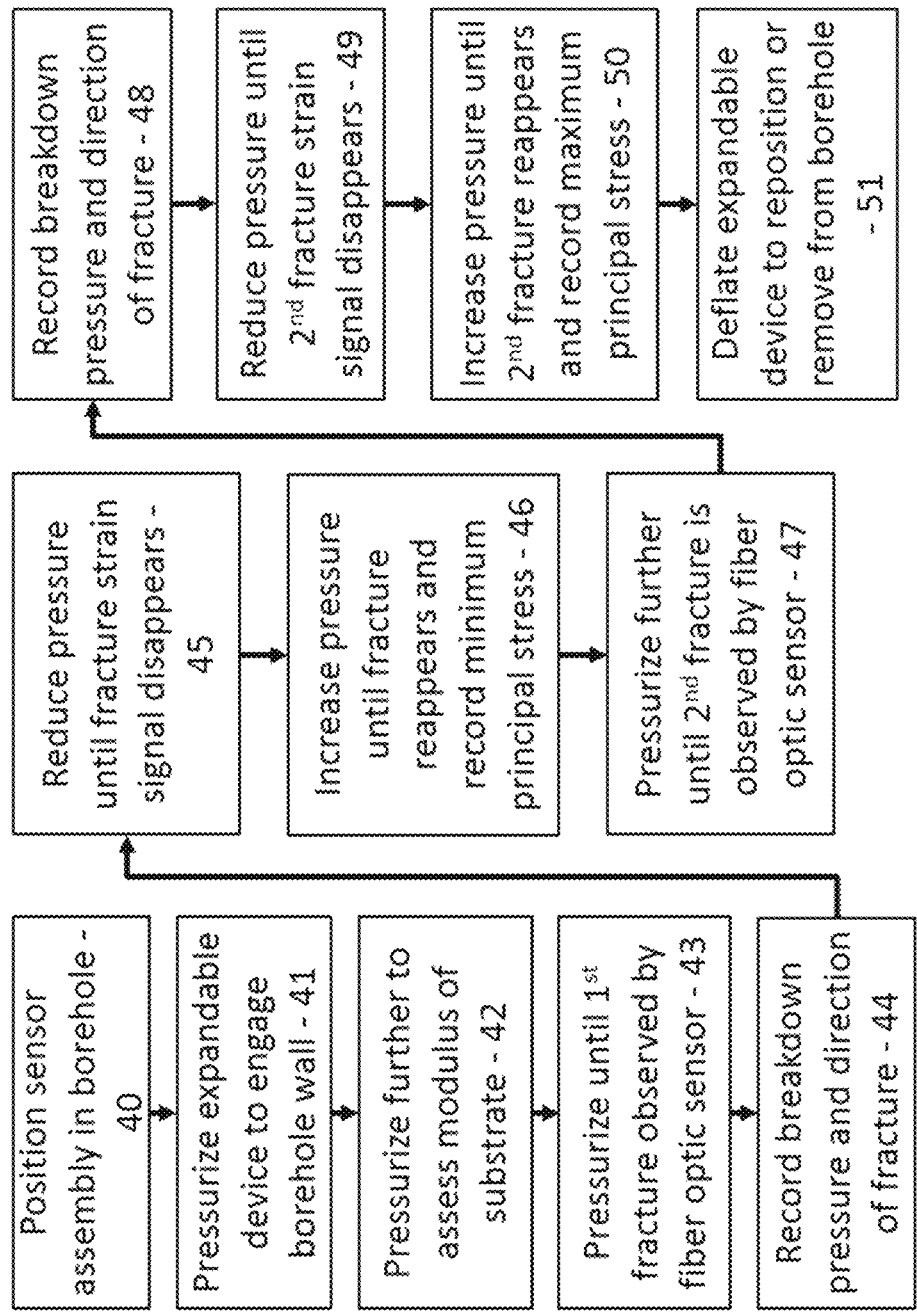
FIG. 9 presents an example method for carrying out in-situ measurements using the sensor assembly.

FIG. 9 depicts an example embodiment of a method of performing an in-situ stress measurement in a substrate. Steps 40-51 are under the control of or monitored by the processing circuitry 60. The method can be performed repeatedly in the same hole at various depths or within multiple holes to measure an in-situ stress field within a substrate. The method is described in conjunction with the structures shown in FIG. 1 and described above, but it may also be performed with a different configuration or arrangement than that shown in FIG. 1. In one example embodiment, the steps 40-51 are performed in the order described. However, steps may be omitted or added, or performed in a different order.

Step 40 positions the sensor assembly 52 in the hole using any appropriate method, such as a wireline or borehole string of pipes. The hole is preferably an open bore, but performing the method may also be used for a cased hole or partially-cased hole. When step 40 is complete, a spatially distributed "baseline" strain measurement 21 is made using the fiber optic sensor(s). The baseline strain measurement is stored in memory for later comparison with subsequent strain measurements.

Step 41 pressurizes the sensor assembly so that the expandable element expands radially to engage the hole wall. A distributed strain measurement may be made to record the changes in the sensing assembly due to expanding to engage the borehole wall. This measurement data may be used to infer curvature, roughness, asymmetry, or discontinuities in the hole.

Step 42 continues pressurization to assess the modulus of the substrate through elastic deformation which may be useful although not needed for in-situ stress measurement. The distributed strain measurement by the fiber optic sensor 14 is proportional to the radial expansion of the hole wall 12 of the substrate 11. Correlating the deformation of the substrate to the pressure applied to the wall allows for determining mechanical properties of the substrate 11, e.g., elastic modulus, shear modulus, and/or bulk modulus.

Step 43 pressurizes the expandable element 13 until a fracture 25 in the hole wall occurs. This fracture event is detected by the fiber optic sensor 14 as a peak in strain. In other embodiments, the fracture event may also be detected by other optional sensors included in the sensor assembly 52 such as for example acoustic emission sensors. The same fiber sensor used to measure distributed strain in the sensor assembly 52 may also be used as a distributed acoustic sensor (DAS), using a coherent optical time domain reflectometry (OTDR) fiber optic sensor interrogator, or the OFDR fiber optic sensor interrogator as described above, operating in an acoustic sensing mode. The distributed strain signal from the one or more fiber optic sensors show periodic peaks 27 in the strain profile as a result of the hole fracture as explained above.

This strain peak data is used in step 44 to determine the axial location and polar angle/direction of the fracture as it intersects the periodic wrapping of the fiber optic sensor along the length of the sensing assembly. The direction of the fracture is stored in memory relative to the sensing assembly, or in another example embodiment, relative to a north/east/south/west bearing on a map. The pressure at which the fracture occurred, the "breakdown pressure", is recorded for use in subsequent calculations. The number of strain peaks and spacing of fiber optic wrapping periods can be used to determine the axial length of the fracture along the hole 26.

In step 45, the internal pressure in the expandable device is decreased such that the peaks in strain in the distributed fiber optic signal disappear or are diminished indicating the closing of the fracture. This pressure will be lower than the breakdown pressure. The strain signal and pressure data are stored in memory.

Step 46 increases pressure in the expandable device to cause the peaks in strain in the distributed fiber optic signal (at known locations) to reappear, indicating that the fracture has been reopened. In most cases, this reopening pressure is less than the breakdown pressure. No fluid flows into the fractures. Strain peaks at different fracture locations may reappear at different pressure levels as the internal pressure increases, indicating variation in in-situ stress along the hole. A pressure value is stored in memory for each fracture detected by the fiber optic sensor. Alternatively or in addition, an average pressure for a set of fractures detected can be used to determine the fracture re-opening pressure. For long sensors, the reopening pressure may vary significantly along the length of the hole, making individual measurement of reopening pressure at each fracture important. This re-opening pressure is equal or proportional to the minimum in-situ stress in the principal minimum stress direction of the substrate.

In step 47, the expandable element is pressurized until a second set of fractures 28 in the hole. This second set of fractures is identified in the distributed strain signal of the fiber optic sensor as a new set of strain peaks 29 at different locations than the first set of strain peaks from the first fracture. Preferably, this second fracture will be substantially perpendicular to the first fracture, but this is not necessarily the case. The distributed fiber optic sensor 14 has the spatial resolution to measure any arbitrary angle between the two fractures. The pressure at which the second fracture occurs is stored in memory as the "maximum breakdown pressure" as indicated in step 48.

Step 49 decreases the pressure in the expandable element until the second set of strain peaks from the second fracture disappear or diminish indicating that the second fracture has closed. This pressure is stored in memory as the closing pressure for the second fracture.

Step 50 increases pressure in the expandable element until the second set of strain peaks (at known locations) corresponding to the second fracture reappear, indicating that the fracture has reopened. Strain peaks at fracture locations may reappear at different pressure levels as the internal pressure increases. As in step 46, a pressure value is stored in memory for each fracture detected by the fiber optic sensor 14 and/or an average pressure for a set of fractures detected can be used to determine the fracture re-opening pressure. For long sensors, reopening pressure may vary significantly along the length of the borehole, making individual measurement of reopening pressure at each fracture important. This re-opening pressure is equal or proportional to the maximum in-situ stress in the principal maximum stress direction of the substrate.

Step 51 decreases the pressure in the expandable element to deflate the sensing assembly 52 so that the sensor is no longer in contact with the hole wall 12 and can be removed from the hole or repositioned within the hole to repeat the method of FIG. 9 at a new location.

Figure 10:
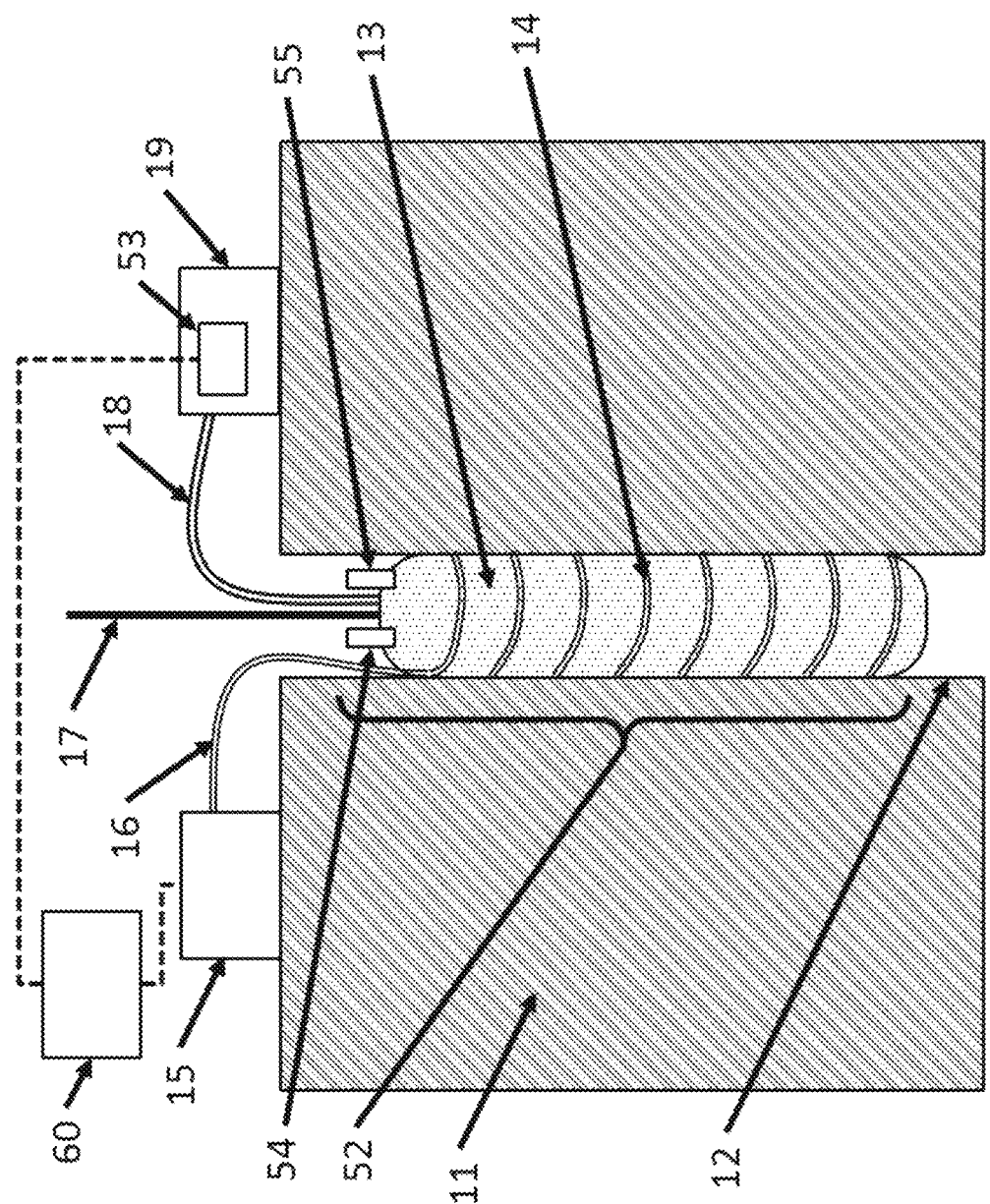
FIG. 10 is a function block diagram of another example sensing apparatus deployed in a hole of a substrate including additional sensors.

FIG. 10 depicts an example embodiment that is similar to the example embodiment shown in FIG. 1 but with additional sensors that may be useful for a variety of sensing applications. An acoustic emission sensor 54 is included with the sensor assembly 52 to detect high frequency sound or vibration pulses that can indicate fracture of the substrate. This acoustic emission sensor 54 can be used to corroborate the occurrence of a fracture in conjunction with the distributed fiber optic sensor 14. An orientation sensor 55, such as an inertial measurement unit (IMU), accelerometer, magnetometer, or gyroscope, may also be included in an embodiment of the sensor assembly 52. The orientation sensor 55 determines the direction of the sensor assembly's 52 measurement relative to a geographical map or absolute coordinate system. Processing circuitry 60 collects data from one or more of the pressure sensor 53, fiber optic interrogator 15, acoustic emission sensor 54, and orientation sensor 55 to calculate in-situ stress and other parameters of interest.

Figure 11:
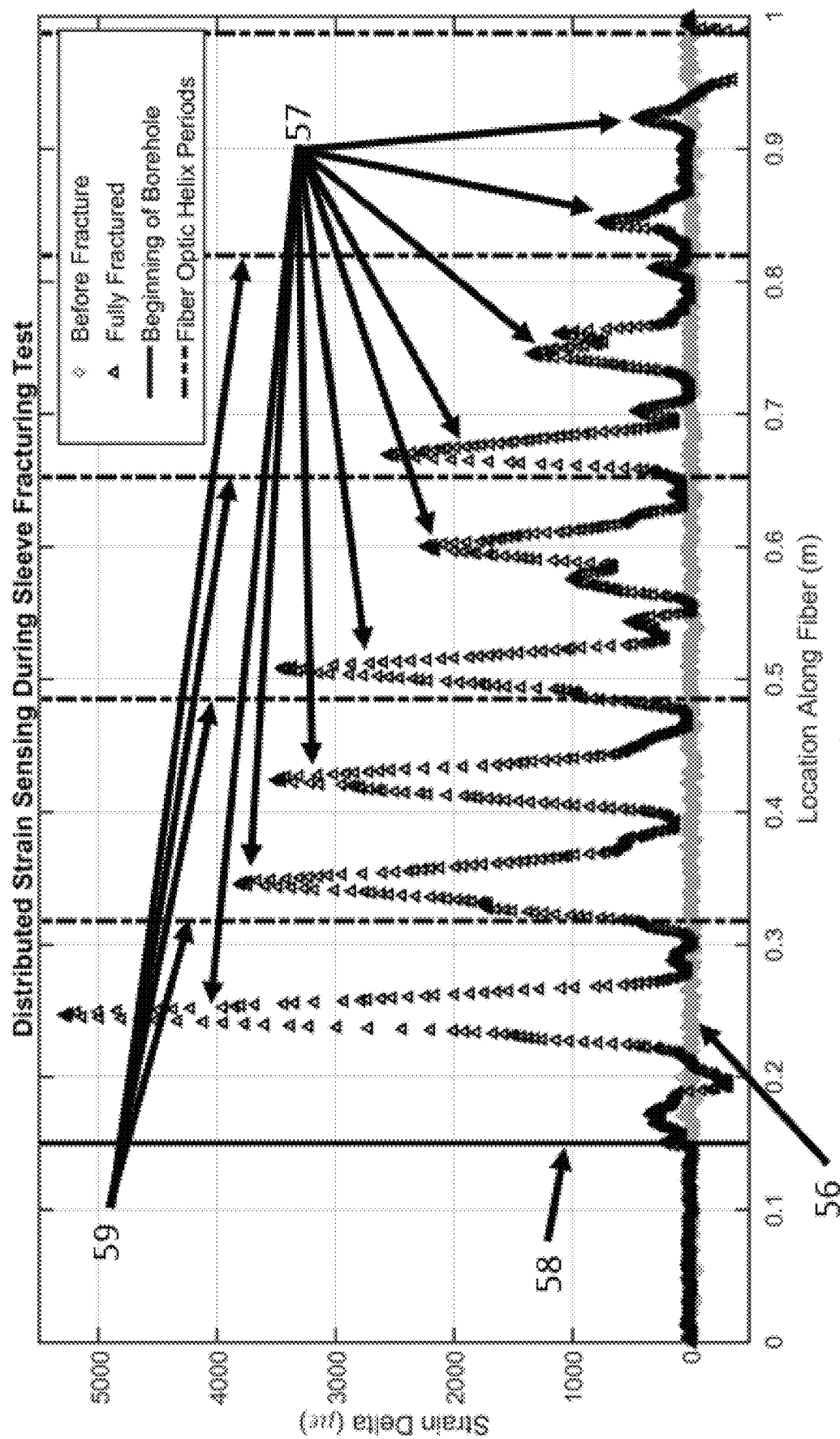
FIG. 11 shows experimental data demonstrating an example of distributed strain datasets for in-situ stress measurements.

FIG. 11 shows experimental data from a laboratory experiment using an example embodiment where a fiber optic sensor is helically wrapped five times around an expandable element in a sensor assembly. An OFDR-based fiber optic sensor interrogator (the Luna ODiSI B) was used to record fiber strain from the sensor Rayleigh scatter signature with sensor measurement points every 0.65 mm along the sensor. The beginning fiber wrap location 58 and each 360° period of wrapping 59 are depicted in the figure.

The sensor assembly 52 was inserted in a hole in a concrete specimen that was loaded in two directions perpendicular to the hole in a load frame to simulate minimum and maximum stress in a substrate. A strain measurement was recorded before fracturing 56. The expandable element was pressurized until a fracture occurred in the specimen. Strain peaks 57 were observed in the high-resolution distributed strain signal at periodic locations along the sensor assembly 52. There are two strain peaks per wrapping period because the specimen was fractured in half, such that the hole had two distinct fractures on opposite sides of its circumference. The magnitude of the fracture as a function of an axial length along the testing assembly and fiber optic sensor shows that the fracture was larger in the middle of the block than at the edges. This data demonstrates the ability to perform the method described in FIG. 9 to detect distributed signals corresponding to fractures in a hole and accurate, in-situ stress (min and max) magnitude and direction measurement.

Figure 12B:
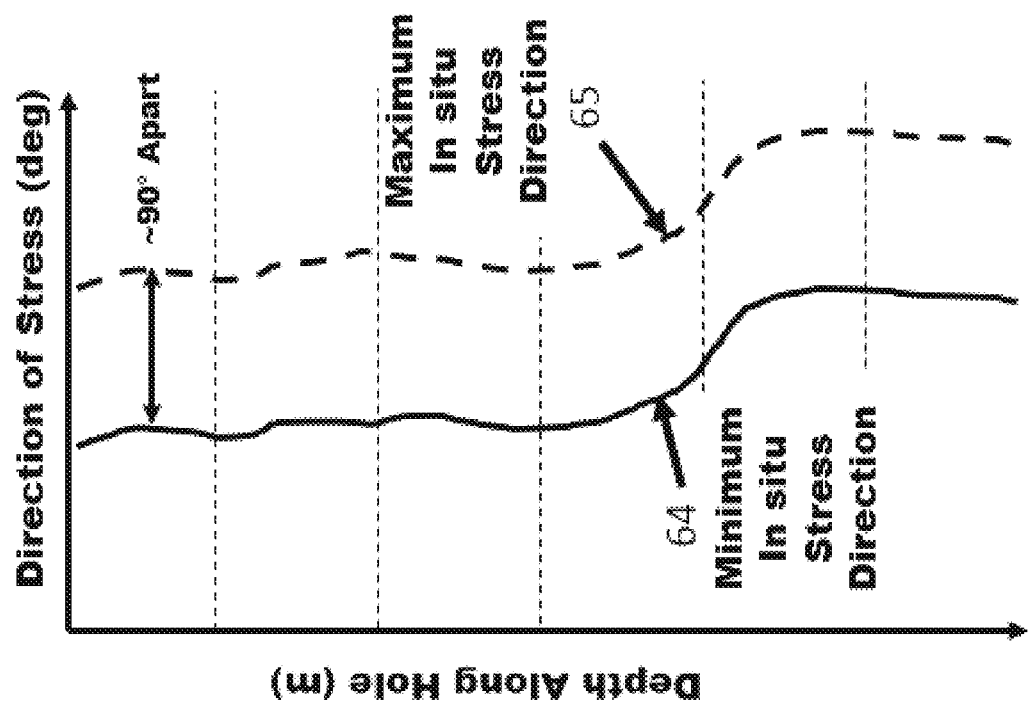
FIGS. 12A and 12B show an example of graphs of output information obtained using the sensor assembly.
Figure 12A:
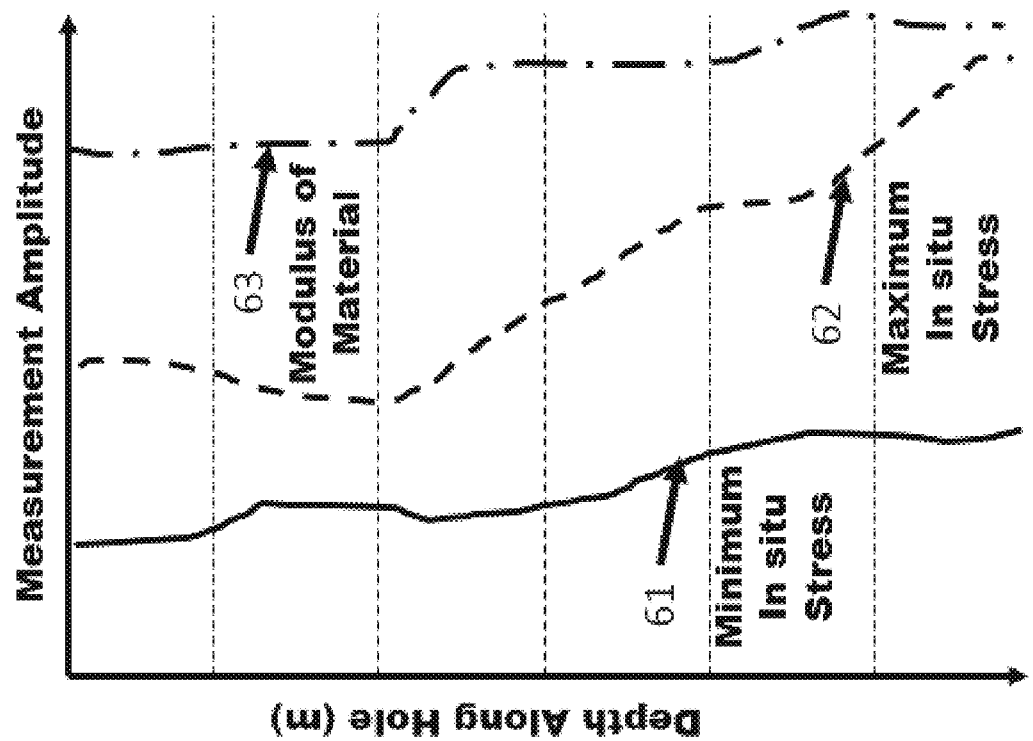

FIGS. 12a and 12b show example output information from the apparatus shown in FIG. 1 and/or FIG. 10, where quantities of interest are plotted versus the depth of the hole. FIG. 12a shows the minimum and maximum in-situ stress values collected during the distributed measurement plotted versus depth. An additional optional quantity—the substrate material modulus—may also be visualized in this manner. The directions (e.g., expressed as angles in units of degrees) sensed for the minimum and maximum stresses are also plotted versus hole depth in FIG. 12b. The directions are nominally spaced 90° apart from each other since they represent the principal axes of the stress state at each depth in the hole. The processing circuitry may display these plots on a display using a suitable graphical user interface to give real-time feedback or as part of a post-processing operation.

Figure 13:
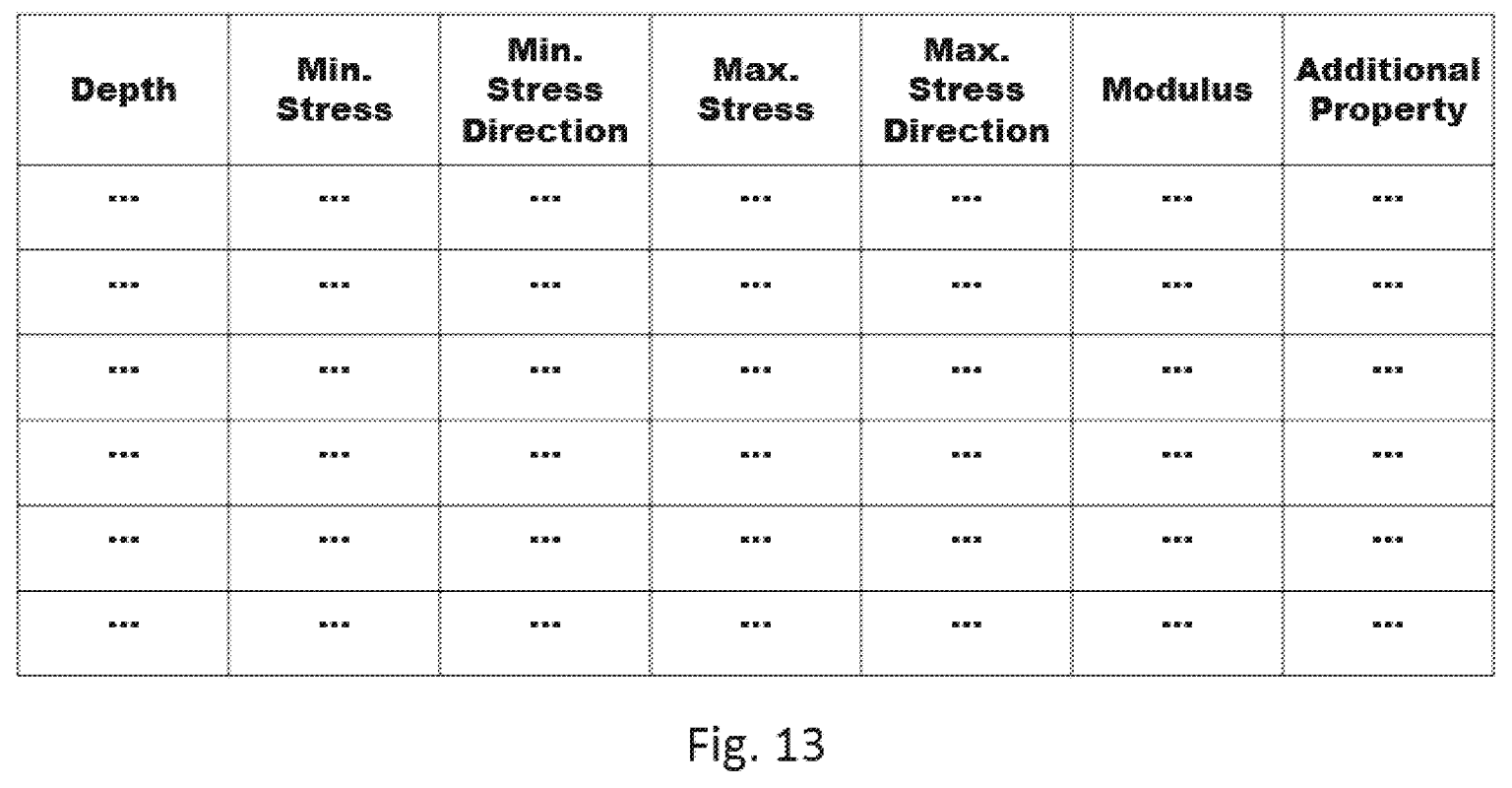

FIG. 13 shows an example of a table of data that may be recorded in an electronic log file for documentation of the measured data (no values are shown as this is an example). In this example embodiment, the first column of data records the depth of the measurement, and the subsequent columns represent various kinds of measurements that may be acquired by the sensing system including: minimum in-situ stress, direction of minimum in-situ stress, maximum in-situ stress, direction of maximum in-situ stress, modulus of the material, and potentially other additional properties of the substrate being evaluated.

Technical Advantages of Described Subject Matter

The technology described above does not require injection of fluid into a subsurface formation and does not require sealing and/or isolating a section of borehole. In addition, the high-resolution fiber optic strain sensing technology detects the direction of stress vectors for one or more fractures and is capable of directly measuring both minimum and maximum in-situ stress for each fracture as opposed to just measuring minimum stress and then making assumptions and calculations to estimate maximum stress. The technology can perform distributed in-situ stress measurements over a long distance producing many data points in one measurement as opposed to isolating a section of borehole and measuring just a single point/value of stress. In addition, the distributed in-situ stress measurements can resolve changes in stress versus borehole depth in a single measurement at high resolution.

The high-resolution distributed fiber optic sensor integrated in the expandable device detects the occurrence, magnitude, direction, opening and closing of fractures, a continuous cross-section of the expandable device to apply uniform pressure to the borehole in many directions so that the fractures occur naturally aligned with the principal stress directions rather than forcing fractures in predefined arbitrary directions. Rotation of the sensor is not necessary to attain a minimum stress, maximum stress, or stress direction measurement.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Circuitry can be described structurally based on its configured operation or other characteristics. For example, circuitry that is configured to perform control operations is sometimes referred to herein as control circuitry and circuitry that is configured to perform processing operations is sometimes referred to herein as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

The technology has been described with reference to particular example embodiments, but it will be appreciated by those skilled in the art that the technology may be embodied in many other forms. Although various embodiments have been shown and described in detail, the claims are not limited to any particular embodiment or example. None of the above description should be read as implying that any particular member, step, range, or function is essential such that it must be included in the claims scope. The scope of patented subject matter is defined only by the claims. All structural and functional equivalents to the features of the above-described embodiments that are known to those of ordinary skill in the art are expressly incorporated herein by reference and are intended to be encompassed by the claims. Moreover, it is not necessary for a device or method to address each and every problem sought to be solved by the technology described, for it to be encompassed by the claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

As used herein, the singular forms "a," "an," and "the" may also refer to plural articles, i.e., "one or more," "at least one," etc., unless specifically stated otherwise.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range.

The term "about" or "approximately" means an acceptable error for a particular recited value, which depends in part on how the value is measured or determined. In certain embodiments, "about" can mean 1 or more standard deviations. When the antecedent term "about" is applied to a recited range or value it denotes an approximation within the deviation in the range or value known or expected in the art from the measurements method. For removal of doubt, it shall be understood that any range stated herein that does not specifically recite the term "about" before the range or before any value within the stated range inherently includes such term to encompass the approximation within the deviation noted above.

The invention claimed is:

1. An apparatus for performing distributed measurements along a hole in a substrate, comprising:
    an expandable insert having an initial diameter configured to be inserted into a hole in a substrate and to expand and contract, where when the expandable insert is expanded to a diameter greater than the initial diameter, the expandable insert is in physical contact with a wall of the hole;
    an optical fiber sensor integrated with the expandable insert to expand and contract as the expandable insert expands and contracts to detect a strain of a wall of the hole as the expandable insert expands to make contact with the substrate;
    a fiber optic interrogator to provide light to the optical fiber sensor and to detect reflected light from the optical fiber sensor;
    a pump coupled to the expandable insert to expand the expandable insert in the hole in the substrate to exert pressure on the wall of the hole;
    a pressure sensor to provide a sensor output indicative of a pressure applied to the wall of the hole by the expandable insert;
    processing circuitry configured to:
    control pressure delivered by the pump to expand the expandable insert to physically contact the wall of the hole until one or more longitudinal fractures in the wall along a length of the hole are detected as being in an open state in the substrate and to contract the expandable insert until the one or more longitudinal fractures are detected as being in a closed state in the substrate;
    process, during the expansion and contraction of the expandable insert, light reflected from the optical fiber sensor to detect the one or more longitudinal fractures being in the open state when the expandable insert is expanded and the one or more longitudinal fractures being in the closed state when the expandable insert is contracted;
    determine, from processing the light reflected from the optical fiber sensor, one or more of the following:
    a polar angle associated with each of the one or more longitudinal fractures, and
    a stress of the substrate at each of multiple locations along a length of each of the one or more longitudinal fractures; and
    generate output information based on the polar angle and the substrate stress at each of multiple locations along the length of each of the one or more longitudinal fractures.

2. The apparatus in claim 1, wherein the processing circuitry is configured to:
    determine strain values along a length of the wall of the hole from light reflected from the optical fiber sensor while the expandable insert is being pressurized;
    determine that one of the strain values exceeds a predetermined value; and
    determine occurrence of an event associated with a fracture in the open state for the one of the strain values that exceeds a predetermined value.

3. The apparatus in claim 1, wherein the processing circuitry is configured to:
    control pressure delivered by the pump up to a breakdown pressure to expand the expandable insert until a first fracture is detected as being in the open state in the substrate to determine the minimum stress in the substrate and/or a polar angle of the first fracture.

4. The apparatus in claim 3, wherein the processing circuitry is configured to:
    control pressure delivered by the pump to contract the expandable insert until a first fracture is detected as being in the closed state and then to expand the expandable insert until the first fracture is detected as again being in the open state to determine a minimum stress associated with the first fracture in the open state.

5. The apparatus in claim 3, wherein the processing circuitry is configured to:
    control pressure delivered by the pump up to a breakdown pressure to expand the expandable insert until a second fracture, different from the first fracture, is detected as being in the open state in the substrate to determine the maximum stress in the substrate and/or a polar angle of the second fracture.

6. The apparatus in claim 5, wherein the processing circuitry is configured to:
    control pressure delivered by the pump to contract the expandable insert until the second fracture is detected as being in the closed state and then to expand the expandable insert until the second fracture is detected as again being in the open state to determine a maximum stress associated with the second fracture.

7. The apparatus in claim 1, wherein the optical fiber sensor is located below a surface of the expandable insert.

8. The apparatus in claim 1, wherein the optical fiber is located on a surface of the expandable insert.

9. The apparatus in claim 1, wherein the optical fiber is helically wrapped around or within the expandable insert.

10. The apparatus in claim 1, wherein the processing circuitry is configured to control pressure delivered by the pump to expand the expandable insert and to determine a mechanical property of the substrate including a modulus of the substrate.

11. The apparatus in claim 1, wherein the polar angle of the first fracture is approximately perpendicular to the second fracture polar angle.

12. The apparatus in claim 1, wherein the fiber optic interrogator is an optical frequency domain reflectometry (OFDR) system to provide coherent light over a range of wavelengths to the optical fiber sensor and detecting reflected light from the optical fiber sensor.

13. The apparatus in claim 12, wherein the optical frequency domain reflectometry (OFDR) system is capable of detecting events at an angular resolution around the circumference of the hole in a range of 90°-0.1°.

14. The apparatus in claim 1, further comprising multiple expandable inserts coupled together in series, wherein each of the multiple expandable inserts is integrated with an associated optical fiber sensor.

15. The apparatus in claim 1, wherein the expandable insert includes a hollow passage through and along a length of the expandable insert.

16. The apparatus in claim 1, wherein the expandable insert includes a solid rod or a hollow pipe inside and along a length of the expandable insert.

17. The apparatus in claim 1, further comprising one or more of the following in the list including one or more acoustic sensors and one or more orientation sensors associated with the expandable insert.

18. The apparatus in claim 1, wherein the processing circuitry is configured to process, during the expansion and contraction of the expandable insert, light reflected from the optical fiber sensor to detect for each of the longitudinal fractures one or more of the following:
the opening of the longitudinal fracture when the expandable insert is expanded;
the closing of the longitudinal fracture when the expandable insert is contracted; and
a size of an aperture of the longitudinal fracture when the expandable insert is expanded.

19. The apparatus in claim 1, wherein the processing circuitry is configured to process, during the expansion and contraction of the expandable insert, light reflected from the optical fiber sensor to detect pre-existing longitudinal fractures.

20. The apparatus in claim 1, wherein the processing circuitry is configured to process, during the expansion and contraction of the expandable insert, light reflected from the optical fiber sensor to detect one or more fractures that extend in the wall in different directions.

21. A method of performing distributed measurements along a hole in a substrate, comprising:
inserting an expandable insert having an initial diameter into a hole in a substrate, where an optical fiber sensor is integrated with the expandable insert to expand and contract as the expandable insert expands and contracts to detect a strain of a wall of the hole as the expandable insert expands to make contact with the substrate;
providing light to the optical fiber sensor;
detecting reflected light from the optical fiber sensor;
expanding the expandable insert to a diameter greater than the initial diameter to exert pressure on the wall of the hole;
generating a sensor output indicative of the pressure on the wall of the hole exerted by the expandable insert;
controlling pressure delivered by a pump to expand the expandable insert to physically contact the wall of the hole until one or more longitudinal fractures in the wall along a length of the hole are detected as being in an open state in the substrate and to contract the expandable insert until the one or more longitudinal fractures are detected as being in a closed state in the substrate;
processing, during the expansion and contraction of the expandable insert, light reflected from the optical fiber sensor to detect the one or more longitudinal fractures being in the open state when the expandable insert is expanded and the one or more longitudinal fractures being in the closed state when the expandable insert is contracted;
determining, from processing the light reflected from the optical fiber sensor, one or more of the following:
a polar angle associated with each of the one or more longitudinal fractures, and
a stress of the substrate at each of multiple locations along a length of the wall of each of the one or more longitudinal fractures; and
generating output information based on the polar angle and the substrate stress at each of multiple locations along the length of each of the one or more longitudinal fractures.

* * * * *